(12) United States Patent
Shigemori et al.

(10) Patent No.: US 7,432,770 B2
(45) Date of Patent: Oct. 7, 2008

(54) SIGNAL TRANSMISSION DEVICE

(75) Inventors: Mikio Shigemori, Ina (JP); Masataka Nomura, Minowa-machi (JP)

(73) Assignee: Seiko Epson Corporation (JP)

( * ) Notice: Subject to any disclaimer, the term of this patent is extended or adjusted under 35 U.S.C. 154(b) by 72 days.

(21) Appl. No.: 11/463,078

(22) Filed: Aug. 8, 2006

(65) Prior Publication Data
US 2007/0052490 A1 Mar. 8, 2007

(30) Foreign Application Priority Data
Aug. 10, 2005 (JP) ............... 2005-232351

(51) Int. Cl.
H04L 7/00 (2006.01)
(52) U.S. Cl. .............. 331/77; 331/74; 331/18; 375/355
(58) Field of Classification Search .......... 331/18, 331/19, 74, 77; 327/141, 144; 375/354, 375/355; 709/238, 248
See application file for complete search history.

(56) References Cited
U.S. PATENT DOCUMENTS
5,568,098 A * 10/1996 Horie et al. ............ 331/16
5,592,508 A * 1/1997 Cooper .................. 375/216
5,621,755 A * 4/1997 Bella et al. ............. 375/219
6,404,834 B1 * 6/2002 Hardin et al. .......... 375/376
6,744,839 B1 * 6/2004 Tada et al. ............. 375/376

FOREIGN PATENT DOCUMENTS
JP 2004-120352 4/2004

OTHER PUBLICATIONS
Rosenbert, R.L. et al., "Optical Fiber Repeatered Transmission Systems Utilizing SAW filters", IEEE Transactions on Sonics and Ultrasonics, May 1983, vol. 30, No. 3, pp. 119-126.*

* cited by examiner

Primary Examiner—Robert J. Pascal
Assistant Examiner—Ryan J. Johnson
(74) Attorney, Agent, or Firm—Harness, Dickey & Pierce, P.L.C.

(57) ABSTRACT

The present invention provides a signal transmission device in which jitter occurring in a clock signal is eliminated. The signal transmission device has a construction in which a transmission end IC chip provided with a transmission part of a data signal and a reception end IC chip provided with a reception part of the data signal, the transmission part and the reception part are connected via a data signal transmission line, an oscillator that outputs a clock signal to the transmission part is connected with the transmission end IC chip, a clock signal transmission line is provided which leads the clock signal output from the oscillator to the reception part, and a SAW filter is arranged in the clock signal transmission line.

7 Claims, 4 Drawing Sheets

SIGNAL TRANSMISSION DEVICE

FIELD

The present invention relates to a signal transmission device, and particularly to a signal transmission device that transmits a signal between IC chips.

BACKGROUND

Some of signal transmission devices which transmit a data signal from a transmission end to a reception end have a construction to transmit a data signal synchronized with a clock signal from the transmission end to the reception end, and to determine whether the data signal is "0" or "1" at the reception end based on the clock signal. Since such signal transmission devices read a data signal at the reception end based on the clock signal, there has been a problem that the data signal cannot be read accurately when noise enters the clock signal to generate jitter.

In addition, in a case of optical communication for performing transmission at high rate and of long distance, the jitter of the clock signal may cause a data transmission error. Thus, it is desired that the jitter of the clock signal be sufficiently small. Therefore, in an optical transceiver module for an optical network, the jitter of the clock signal is eliminated such that the optical transceiver module has a construction provided with a clock converter circuit which is constituted of a phase-locked loop (PLL) circuit utilizing a voltage controlled SAW oscillator (VCSO). Further, the optical transceiver module converts, in the clock converter circuit, a low frequency clock having many jitters into a high frequency clock signal with the jitter reduced, and uses this signal as a reference clock signal for multiplexing plural pieces of transmission data into one piece of transmission data. Incidentally, the clock converter circuit suppresses the occurrence of jitter in the signal output from the VCSO, by connecting a first band pass filter to a PLL feedback loop output terminal of the VCSO, and connecting a second band pass filter to an output terminal of a feedback buffer differential amplifier in the VCSO (refer to Patent Document 1, for example).

Patent Document 1: JP-A-2004-120352

SUMMARY

Some of the signal transmission devices to transmit a data signal from the transmission end to the reception end include, for example, those which perform transmission of a data signal among a plurality of IC chips mounted on a substrate equipped in an electronic apparatus such as a computer. In this case, the substrate mounts thereon the transmission end IC chip and the reception end IC chip, and to these IC chips are connected a data signal transmission line through which a data signal is transmitted and a clock signal transmission line through which a clock signal is transmitted.

Meanwhile, the substrate mounts, which has the data signal transmission line and the clock signal transmission line formed thereon, in addition to the transmission end IC chip and the reception end IC chip concerning transmission of the data signal, a plurality of IC chips (other IC chips) operating at high rate. Therefore, since noises generated in other IC chips enters a clock signal transmitted through the clock signal transmission line, jitter occurs in the clock signal.

Moreover, as data transmission rate has increased in recent years, a data amount for the IC chip to process has increased and a data amount to transmit from the transmission end IC chip to the reception end IC chip also has increased. Furthermore, as a clock signal has been speeded up, a clock pulse period has been much shorter. Therefore, as transmission distance of a signal is longer and the clock signal is speeded up, effects of the jitter due to noises increases to affect data transmission. That is, a problem has appeared that even a few noises causes an erroneous determination of the data signal.

Further, an apparatus for eliminating jitter by using the PLL circuit described above is very expensive. Therefore, in a case of the signal transmission device, which transmits and receives data among a plurality of IC chips, there has been a problem that the apparatus for eliminating jitter by using the PLL circuit causes extremely high cost.

The invention has an object to provide a signal transmission device in which jitter generated in a clock signal is eliminated.

In an aspect of the invention, a signal transmission device is a signal transmission device including a clock signal transmission line through which a clock signal is transmitted, and a data signal transmission line through which a data signal synchronized with the clock signal is transmitted. The clock signal transmission line is provided with a band pass filter. There are some cases where noise enters the clock signal transmitted through the clock signal transmission line due to an effect from the outside. However, the clock signal only passes through the band pass filter and the noise is removed from the clock signal. Therefore, the signal transmission device can transmit the clock signal from which the noise is removed. As a result, an erroneous determination of the data signal can be avoided.

Further, the aspect of the invention is that the band pass filter is a SAW filter. In this case, the noise can be removed from the clock signal even in the signal transmission device utilizing a clock signal of high frequency.

Furthermore, the aspect of the invention is that the clock signal is a spread spectrum clock signal spread over a predetermined frequency band, and the SAW filter is a band pass filter that passes the frequency band. This enables the signal transmission device to use a spread spectrum clock, and electromagnetic interference (EMI) can be prevented from occurring in an electronic apparatus equipped with the signal transmission device.

Moreover, in another aspect of the invention, a signal transmission device is a signal transmission device, including a clock signal that outputs an oscillator, a transmission part that converts parallel data into serial data, and outputs the serial data synchronized with the clock signal, and a reception part that receives the serial data, and converts the serial data into parallel data based on the clock. A band pass filter is provided to a clock signal transmission line that supplies the reception part with the clock signal. There are some cases where noise enters the clock signal transmitted through the clock signal transmission line due to an effect from the outside. However, the clock signal only passes through the band pass filter and the noise is removed from the clock signal. Therefore, the signal transmission device can input to the reception part the clock signal from which the noise is removed.

In addition, the aspect of the invention is that the band pass filter is a SAW filter. The clock signal of high frequency even can pass through, utilizing the SAW filter. Accordingly, even if the clock signal of the signal transmission device is high frequency, it is possible to use a clock signal from which noise is removed, and prevent an erroneous determination of the data signal.

Further, the aspect of the invention is that the clock signal transmitted from the oscillator to the reception part is a spread spectrum clock signal spread over a predetermined frequency band, and the band pass filter is a band pass filter that passes the frequency band. This enables the signal transmission device to use a spread spectrum clock, and electromagnetic interference (EMI) can be prevented from occurring in an electronic apparatus equipped with the signal transmission device.

Furthermore, in yet another of the invention, a signal transmission device is a signal transmission device, including a clock signal that outputs an oscillator, a transmission end IC chip connected to the oscillator and provided with a transmission part that outputs a data signal synchronized with the clock signal, a reception end IC chip provided with a reception part of the data signal, a data signal transmission line that connects the transmission part with the reception part, and transmits the data signal, a clock signal transmission line that transmits the clock signal output from the oscillator to the reception end IC. The clock signal transmission line is provided with a SAW filter.

If noise enters a clock signal transmitted through the clock signal transmission line, the noise can be removed by the SAW filter that passes only a band corresponding to a frequency of the clock signal. Therefore, jitter due to the noise dose not occur in the clock signal. Moreover, since the signal transmission device reads a data signal based on the clock signal without jitter at the reception part, it is possible to precisely determine whether the data signal is "0" or "1". Further, the SAW filter only is used in order to remove the noise from the clock signal, thus enabling removal of the noise with a small and inexpensive system configuration.

Additionally, the aspect of the invention is that the clock signal transmission line connects between the transmission end IC chip and the reception end IC chip, and the clock signal supplied to the transmission end IC chip is supplied to the clock signal transmission line. Further, the aspect of the invention is that the clock signal transmission line connects the oscillator with the reception end IC chip. According to these aspects, the reception end IC chip can be supplied with the clock signal via the transmission end IC chip or directly from the oscillator.

Further, an yet another aspect of the invention is that the transmission end IC chip is provided with a plurality of the transmission parts and the reception end IC chip is provided with the reception parts of the same number as the plurality of the transmission parts, and the transmission part and the reception part are connected via the data signal transmission line on a one-to-one basis. This enables to transmit a plurality of data signals in parallel from the transmission end IC chip to the reception end IC chip.

Moreover, in the aspect of the invention, the signal transmission device is provided with a phase-locked loop circuit that increases a frequency of the clock signal in the transmission end IC chip and the reception end IC chip. Therefore, the clock signal can be high frequency, and the data signal can be transmitted at a high rate from the transmission end IC chip to the reception end IC chip.

In addition, the aspect of the invention is that the SAW filter is provided such that the clock signal is adjacent to the reception end IC chip in. That is, since the SAW filter is arranged in the clock signal transmission line near the reception end IC chip, the distance from the SAW filter to the reception end IC chip is much shorter than the distance from the transmission end IC chip to the SAW filter. Therefore, noise can be prevented from entering the clock signal transmitted through the clock signal transmission line, and a clock signal in which jitter dose not occur due to noise can be input to the reception end IC chip.

DETAILED DESCRIPTION

Figure 1:
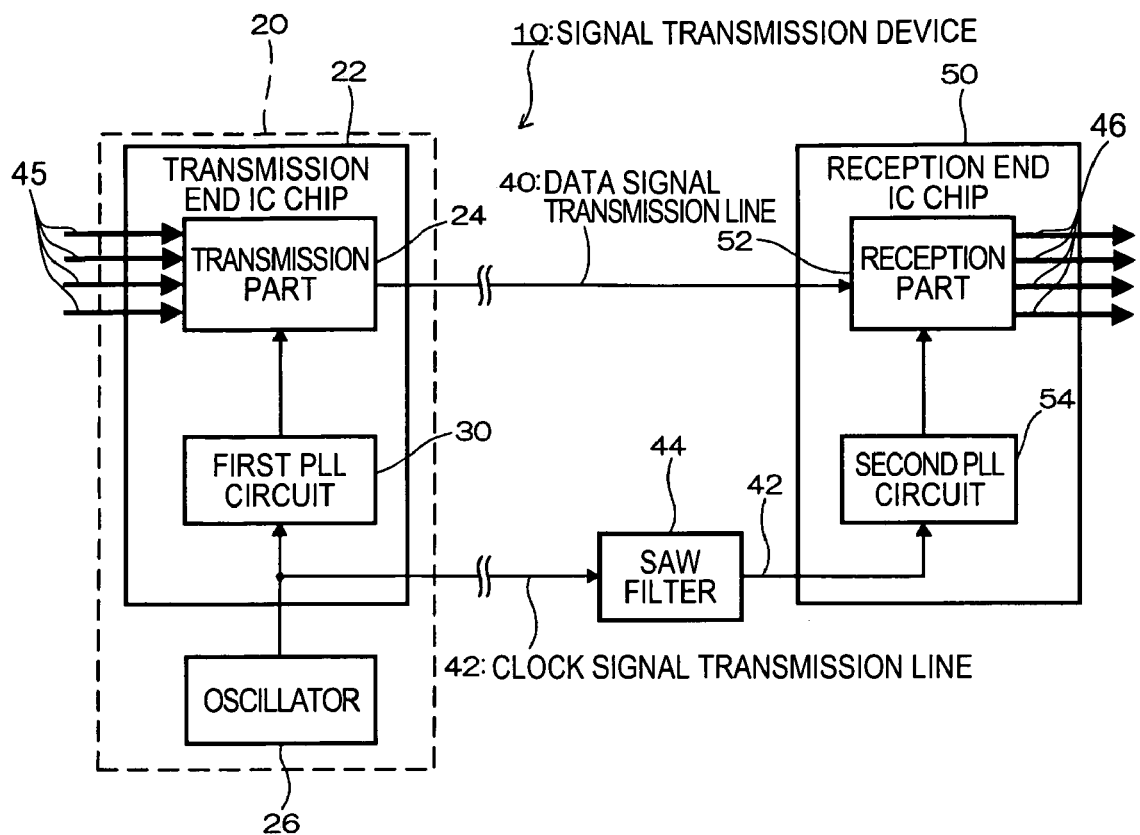
FIG. 1 is a block diagram of a signal transmission device according to the present teachings.

The signal transmission device according to the present teachings will be described below. FIG. 1 is a block diagram of the signal transmission device. A signal transmission device 10 has a transmission end integrated circuit (IC) chip 22 that sends a data signal. The transmission end IC chip 22 is connected with an oscillator 26 outputting a clock signal, and the transmission end IC chip 22 and the oscillator 26 constitute a transmission stage 20. Moreover, the transmission end IC chip 22 is provided with a transmission part 24 of a data signal and a first phase-locked loop (PLL) circuit 30 that increases a frequency of the clock signal.

Figure 2:
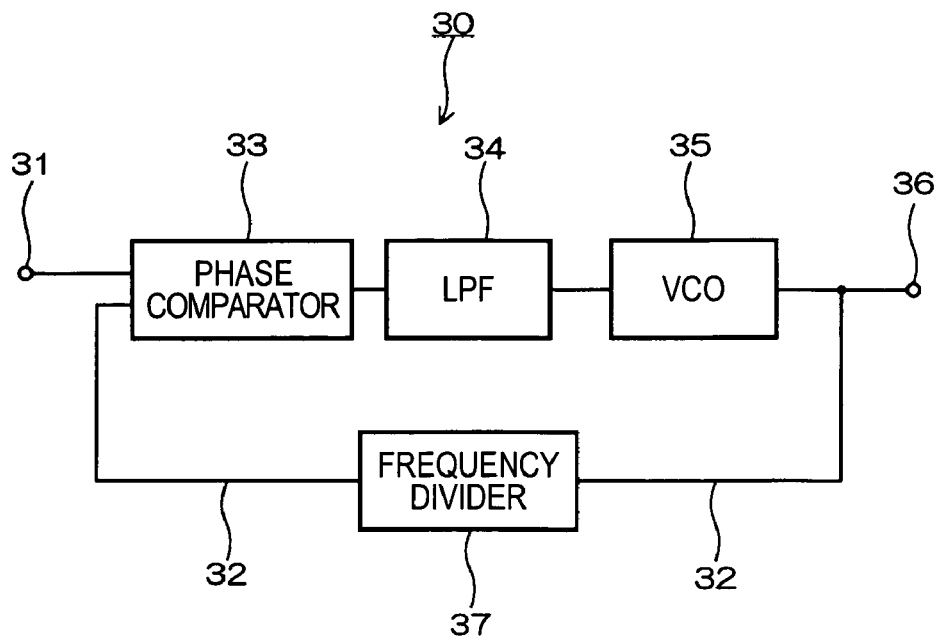
FIG. 2 is a block diagram of a first PLL circuit.

FIG. 2 shows a block diagram of the first PLL circuit. The first PLL circuit 30 is connected with the oscillator 26 via an input terminal 31, and has a phase comparator 33 connected to a feedback loop 32. The phase comparator 33 outputs a difference signal voltage based on the clock signal input from the oscillator 26 and the clock signal input from the feedback loop 32. The subsequent stage of this phase comparator 33 is connected to a low-pass filter (LPF) 34. The LPF 34 removes a high frequency component of the difference signal voltage and the like.

The LPF 34 is connected to a voltage-controlled oscillator (VCO) 35. The VCO 35 outputs a clock signal of a frequency corresponding to the difference signal voltage input from the LPF 34. The VCO 35 is connected to the feedback loop 32 and an output terminal 36 of the first PLL circuit 30. The feedback loop 32 is provided with a frequency divider 37 that divides the clock signal output from the VCO 35 by a set frequency division ratio.

Further, a transmission part 24 shown in FIG. 1 is connected to an output of the first PLL circuit 30. That is, the transmission part 24 is connected with the VCO 35 via the output terminal 36. The output of the transmission part 24 is connected to a data signal transmission line 40. The transmission part 24 inputs a data signal and a clock signal from the first PLL circuit 30, and transmit the data signal synchronized with this clock signal to the data signal transmission line 40.

In addition, the transmission end IC chip 22 is connected with a clock signal transmission line 42, and branches a clock signal output from the oscillator 26 before an input stage of the first PLL circuit 30, and leads the branched clock signal to the clock signal transmission line 42. Incidentally, the clock signal transmission line 42 may be arranged in parallel with the data signal transmission line 40. Specifically, the transmission distances of the signal transmitted through the clock signal transmission line 42 and the data signal transmission line 40 preferably are the same.

Furthermore, the signal transmission device 10 is provided with a reception end IC chip 50. The reception end IC chip 50 is provided with a reception part 52 and a second PLL circuit 54. The second PLL circuit 54 has the same construction as the first PLL circuit 30 provided to the transmission end IC chip 22, and is connected to a clock signal transmission line 42. That is, an input of a phase comparator included in the second PLL circuit 54 is connected to the clock signal transmission line 42 and a feedback loop. Incidentally, the clock signal transmission line 42 is provided with a surface acoustic wave (SAW) filter 44. The SAW filter 44 is preferably arranged near the reception end IC chip 50. Specifically, the SAW filter 44 is preferably arranged immediately before a portion where the clock signal transmission line 42 connects to the reception end IC chip 50.

Additionally, the reception part 52 is connected to an output of the second PLL circuit 54 and the data signal transmission line 40. The reception part 52 determines, on the basis of a clock signal input from the second PLL circuit 54 via the data signal transmission line 40, whether a data signal input from the transmission part 24 is "0" or "1". In other words, the reception part 52 reads a data signal on the basis of a clock signal. Further, the reception part 52 outputs the read data signal.

Next, an operation of the signal transmission device 10 is described. Firstly, the oscillator 26 outputs a clock signal to the transmission end IC chip 22. The clock signal input to the transmission end IC chip 22 is supplied to the first PLL circuit 30 and the clock signal transmission line 42. The first PLL circuit 30 increases the frequency of the clock signal to output to the transmission part 24. Further, the transmission part 24 synchronizes parallel data input from a parallel data input line 45 with the clock signal to convert into serial data, and transmits the serial data via the data signal transmission line 40 to the reception end IC chip 50.

Furthermore, the clock signal supplied to the clock signal transmission line 42 is input to the SAW filter 44. A center frequency of the SAW filter 44 approximately coincides with the frequency of the clock signal. Therefore, the SAW filter 44 removes the noise from the clock signal entering during transmitting of the signal through the clock signal transmission line 42. That is, while the clock signal is transmitted through the clock signal transmission line 42, various frequency noises superimpose to the clock signal. The noises, however, are removed, other than the signal of the frequency corresponding to that of the clock signal, by arranging the SAW filter 44 of which the frequency approximately coincides with the frequency of the clock signal at a certain portion in the clock signal transmission line 42. The removal of the noise prevents jitter from occurring in the clock signal.

Moreover, a frequency pass-bandwidth of the SAW filter 44 is narrow, and the SAW filter 44 has a characteristic of significantly attenuating a signal outside the pass-band. Therefore, it is possible to suppress an occurrence of jitter due to the noise having a frequency near the frequency the clock signal. Furthermore, the longer transmission distance increases the possibility that noise enters the clock signal. However, since the SAW filter 44 is arranged adjacent to the reception end IC chip 50, the distance of the clock signal transmission line 42 from an output of the SAW filter 44 to the reception end IC chip 50 is extremely short, and thus, no noise enters during the distance. Accordingly, a clock signal with no jitter occurring is input to the second PLL circuit 54 arranged on the reception end IC chip 50.

Further, the second PLL circuit 54 increases the frequency of the clock signal to output the reception part 52. The reception part 52 converts serial data input via the data signal transmission line 40 into parallel data based on the clock signal output from the second PLL circuit 54, and outputs from the parallel data output line 46. Incidentally, since the distance of the data signal transmission line 40 is similar to that of the clock signal transmission line 42, and the clock signal is transmitted in parallel with the data signal, a phase shift occurs between these signals. Consequently, the reception part 52 can accurately conduct a determination whether the data signal is "0" or "1" based on the clock signal. Moreover, the reception part 52 outputs the data signal after the determination. In this way, a data signal is transmitted from the transmission end IC chip 22 to the reception end IC chip 50.

The signal transmission device 10 having the clock signal transmission line 42 provided with the SAW filter 44 can, thus remove noise when the clock signal passes through the SAW filter 44. Accordingly, the signal transmission device 10 can obtain a clock signal with no jitter that occurs due to noise.

Moreover, since the signal transmission device 10 has the SAW filter 44 to be a jitter filter at a portion immediately before an input of the clock signal to the reception end IC chip 50, no noise newly enters the clock signal from which noise has been removed at the SAW filter 44, and only a clock signal can be input to the reception end IC chip 50. Specifically, the signal transmission device 10 can input a clock signal with no jitter occurring to the reception end IC chip 50. Consequently, the reception part 52 of the signal transmission device 10 can accurately read a data signal based on a clock signal with no jitter occurring.

Additionally, since the signal transmission device 10 uses the SAW filter 44 as the jitter filter, a small and inexpensive system can be constituted.

Incidentally, in the above-mentioned embodiment, the transmission end IC chip 22 is provided with the first PLL circuit 30 and the reception end IC chip 50 is provided with the second PLL circuit 54 to increase a frequency of a clock signal. However, other constructions may be such that the first PLL circuit 30 and the second PLL circuit 54 are not provided. Specifically, the constructions may be that the transmission part 24 inputs a clock signal directly from the oscillator 26, and the reception part 52 inputs a clock signal directly from the clock signal transmission line 42.

Figure 5:
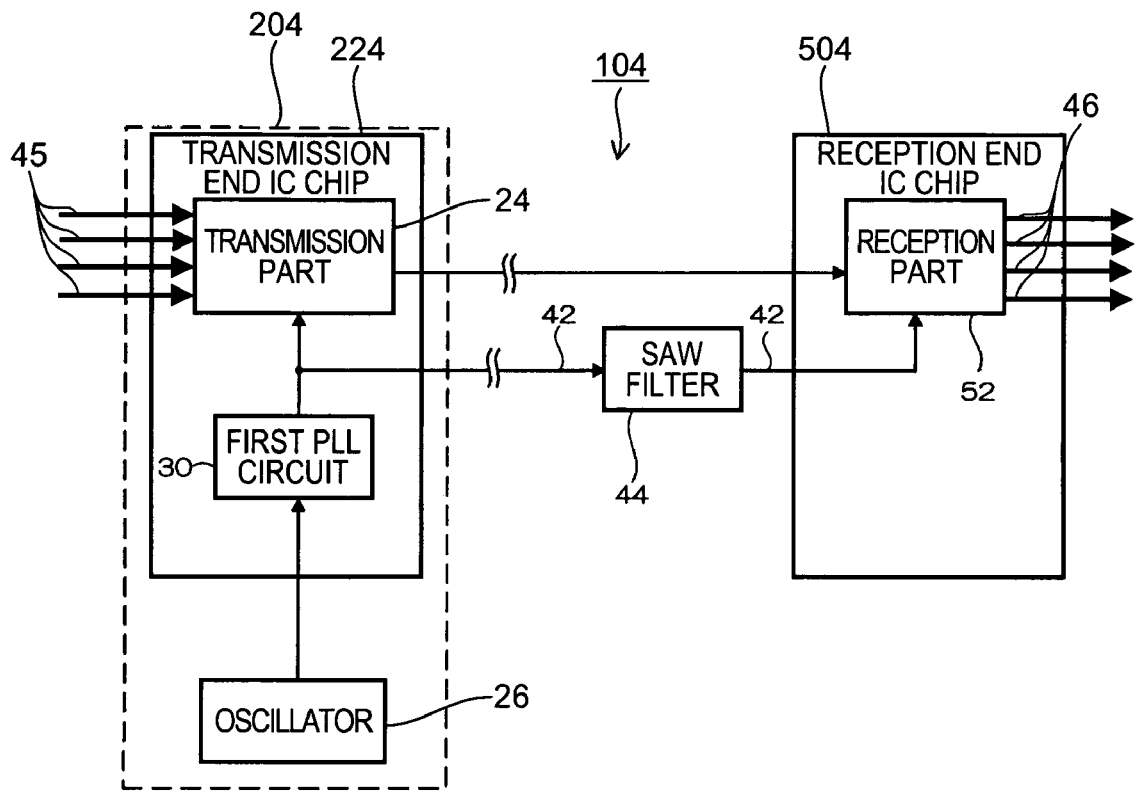
FIG. 5 is a block diagram of a modified example of the signal transmission device.

A modified example of the above-mentioned embodiment is shown in FIG. 5. A signal transmission device 104 shown in FIG. 5 has a transmission stage 204 provided with a transmission end IC chip 224 and an oscillator 26, and a reception end IC chip 504. Further, the signal transmission device 104 has a construction in which an output of a first PLL circuit 30 provided in the transmission end IC chip 224 is connected to a clock signal transmission line 42 having a SAW filter 44 arranged at a certain portion therein, and a reception part 52 inputs a clock signal directly from the clock signal transmission line 42. In this construction, the reception end IC chip 504 need not be provided with the PLL circuit, and a circuit configuration of the reception end IC chip 504 can be simplified. Incidentally, in this construction, the first PLL circuit 30 may be a spread spectrum PLL circuit that spreads a clock signal to a predetermined frequency band. In a case of using the spread spectrum PLL circuit, the SAW filter 44 is a filter that passes the frequency band over which the signal is spread.

Next, a second embodiment is described. In the second embodiment, a modified example of the signal transmission device according to the first embodiment, and the same component part as the signal transmission device according to the first embodiment is denoted with the same number and the description thereof is omitted or simplified.

Figure 3:
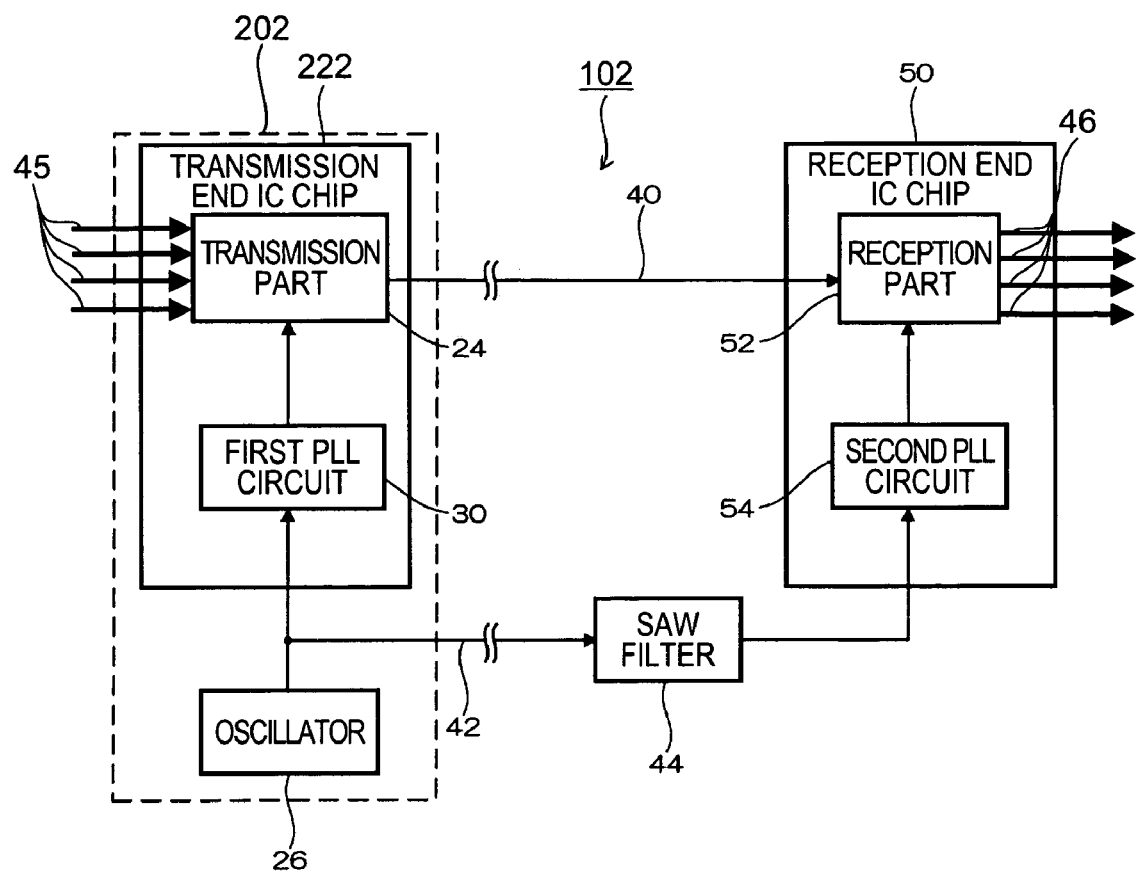
FIG. 3 is a block diagram of another signal transmission device according to the present teachings.

FIG. 3 is a block diagram of a signal transmission device according to the present teachings. A signal transmission device 102 has a transmission end IC chip 222 provided with a transmission part 24 and a first PLL circuit 30. Further, the transmission end IC chip 222 and an oscillator 26 constitute a transmission stage 202. The transmission end IC chip 222 is connected with the oscillator 26 from which a clock signal is input. In addition, the signal transmission device 102 has a reception end IC chip 50 provided with a reception part 52 and a second PLL circuit 54. The transmission part 24 and the reception part 52 are connected with each other via a data signal transmission line 40. Furthermore, in the connection between the oscillator 26 and the transmission end IC chip 222, a clock signal transmission line 42 is connected to the preceding stage of a portion where a clock signal output from the oscillator 26 is input to the transmission end IC chip 222. Specifically, a clock signal output from the oscillator is branched at the preceding stage of the input to the transmission end IC chip 222 to be supplied to the clock signal transmission line 42 and the transmission end IC chip 222. Consequently, a SAW filter 44 is arranged on the clock signal transmission line 42. The SAW filter 44 is arranged immediately before a portion where a clock signal is input to the reception end IC chip 50.

The signal transmission device 102 like this can conduct the same operation and can obtain the same effect as the signal transmission device described in the first embodiment.

Next, a third configuration is described. In the third configuration, a modified example of a signal transmission device according to the first and second configurations, and the same component part as the signal transmission device according to the first and second embodiments is denoted with the same number and the description thereof is omitted.

Figure 4:
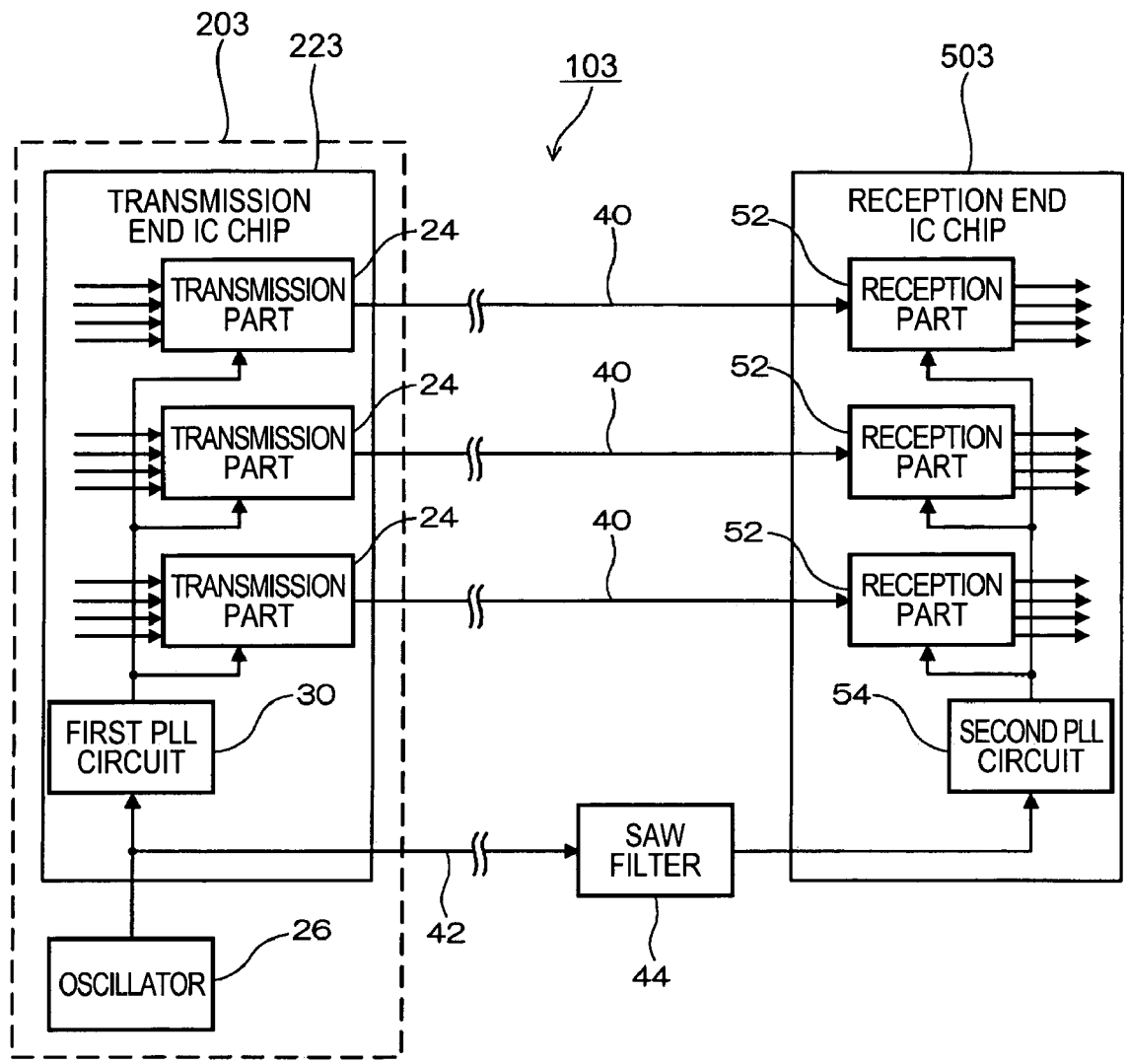
FIG. 4 is a block diagram of another signal transmission device according to the present teachings.

FIG. 4 is a block diagram of a signal transmission device according to the third embodiment. A signal transmission device 103 has a transmission stage 203 provided with an oscillator 26 and a transmission end IC chip 223 connected with the oscillator 26. The transmission end IC chip 223 is provided with a first PLL circuit 30 and a plurality of transmission parts 24, and each of the transmission parts 24 is connected to the first PLL circuit 30. An input of the first PLL circuit 30 is connected to the oscillator 26. Further, the signal transmission device 103 has a reception end IC chip 503 provided with a second PLL circuit 54 and a plurality of reception parts 52, and each of the reception parts 52 is connected to the second PLL circuit 54. Furthermore, the transmission parts 24 are connected with the reception parts 52 via a data signal transmission line 40 on a one-to-one basis. In addition, an input of the second PLL circuit 54 is connected with the oscillator 26 via a clock signal transmission line 42 through the transmission end IC chip 223. In the clock signal transmission line 42 is arranged a SAW filter 44, and the SAW filter 44 is arranged immediately before a portion where a clock signal is input to the reception end IC chip 503 and adjacent to the reception end IC chip 503.

The signal transmission device 103 like this can transmit a plurality of data signals from the transmission end IC chip 223 to the reception end IC chip 503. Further, the signal transmission device 103 can obtain the same effect as the signal transmission device described in the first configuration.

Additionally, FIG. 4 shows a construction in which, as with the signal transmission device of the first configuration, the transmission end IC chip 223 and the reception end IC chip 503 are connected to the clock signal transmission line 42, and a clock signal is transmitted via the transmission end IC chip 223 from the oscillator 26 to the reception end IC chip 503. However, in this configuration, a construction may be such that, as with the signal transmission device of the second configuration, the oscillator 26 and the reception end IC chip 503 are connected to the clock signal transmission line 42, and a clock signal is transmitted directly from the oscillator 26 to the reception end IC chip 503.

Incidentally, the signal transmission device may have a construction in which, in addition to the construction of the signal transmission device described in the first to third configuration, a reception end IC chip is provided with a transmission part and a transmission end IC chip is provided with a reception part; these parts are connected with each other via a data signal transmission line; the transmission part provided to the reception end IC chip is connected to an oscillator that outputs a clock signal; a clock signal transmission line is provided which leads the clock signal to the reception part provided to the transmission end IC chip; and a SAW filter is arranged in the clock signal transmission line and immediately before a portion where the clock signal is input to the transmission end IC chip. This makes it possible for the transmission end IC chip and the reception end IC chip to transmit a data signal with each other.

Furthermore, the first to third configuration use the oscillator 26 arranged adjacent to the transmission end IC chip as a clock signal source for explanation, however a clock signal transmitted from another apparatus can be used instead of the oscillator 26.

The invention claimed is:

1. A signal transmission device, comprising:

an oscillator that outputs a clock signal;

a first phase-locked loop circuit that increases a frequency of the clock signal;

a transmission part that converts parallel data into serial data, and outputs the serial data synchronized with the clock signal from the first phase-locked loop circuit;

a second phase-locked loop circuit that increases a frequency of the clock signal from the oscillator, which was transmitted through a clock signal transmission line; and a reception part that receives the serial data, and converts the serial data into parallel data based on the clock signal from the second phase-locked loop circuit, wherein a surface acoustic wave (SAW) filter is provided to the clock signal transmission line that supplies the reception part with the clock signal.

2. The signal transmission device according to claim 1, wherein the clock signal transmitted from the oscillator to the reception part is a spread spectrum clock signal spread over a predetermined frequency band, and the SAW filter passes the predetermined frequency band.

3. A signal transmission device, comprising:

an oscillator that outputs a clock signal;

a transmission end IC chip connected to the oscillator and provided with a first phase-locked loop circuit that increases a frequency of the clock signal and provided with a transmission part that outputs a data signal synchronized with the clock signal from the first phase-locked loop circuit;

a reception end IC chip provided with a reception part that receives the data signal and provided with a second phase-locked loop circuit that increases a frequency of the clock signal from the oscillator;

a data signal transmission line that connects the transmission part with the reception part, and transmits the data signal; and a clock signal transmission line that transmits the clock signal from the oscillator to the reception end IC, wherein the clock signal transmission line is provided with a SAW filter.

4. The signal transmission device according to claim 3, wherein the clock signal transmission line connects the transmission end IC chip and the reception end IC chip, and the clock signal supplied to the transmission end IC chip is supplied to the clock signal transmission line.

5. The signal transmission device according to claim 3, wherein the clock signal transmission line connects the oscillator with the reception end IC chip.

6. The signal transmission device according to claim 3, wherein the transmission end IC chip is provided with a plurality of the transmission parts and the reception end IC chip is provided with a number of the reception parts equal to the number of the plurality of transmission parts, and the transmission parts and the reception parts are connected via the data signal transmission in a one-to-one correspondence.

7. The signal transmission device according to claim 3, wherein the SAW filter is adjacent to the reception end IC chip.

* * * * *